(12) United States Patent
Bolton

(10) Patent No.: US 10,003,973 B2
(45) Date of Patent: Jun. 19, 2018

(54) AIRCRAFT WIRELESS NETWORK FOR FIXED AIRCRAFT COMPONENTS

(71) Applicant: GE Aviation Systems Limited, Cheltenham, Gloucestershire (GB)

(72) Inventor: Luke Patrick Bolton, Cheltenham (GB)

(73) Assignee: GE AVIATION SYSTEMS LIMITED, Glouchestershire (GB)

( * ) Notice: Subject to any disclaimer, the term of this patent is extended or adjusted under 35 U.S.C. 154(b) by 120 days.

(21) Appl. No.: 14/969,419

(22) Filed: Dec. 15, 2015

(65) Prior Publication Data

US 2016/0174075 A1 Jun. 16, 2016

(30) Foreign Application Priority Data

Dec. 15, 2014 (GB) .................................. 1422300.2

(51) Int. Cl.
| | |
|---|---|
| H04W 12/08 | (2009.01) |
| H04L 29/06 | (2006.01) |
| H04L 29/08 | (2006.01) |
| H04W 84/12 | (2009.01) |

(52) U.S. Cl.
CPC ............. H04W 12/08 (2013.01); H04L 63/10 (2013.01); H04L 67/12 (2013.01); H04W 84/12 (2013.01)

(58) Field of Classification Search
CPC ... H04L 63/08; H04L 63/083; H04L 63/0861; H04L 63/10; H04W 12/06
See application file for complete search history.

(56) References Cited

U.S. PATENT DOCUMENTS

| | | | |
|---|---|---|---|
| 6,269,246 B1 | 7/2001 | Rao et al. | |
| 8,433,894 B2 | 4/2013 | Reznik et al. | |
| 9,635,548 B2* | 4/2017 | Claussen ............... | H04W 12/06 |
| 2005/0026608 A1* | 2/2005 | Kallio ................ | H04B 7/18563 455/431 |
| 2008/0182573 A1* | 7/2008 | Lauer ................. | H04B 7/18506 455/431 |
| 2009/0196201 A1* | 8/2009 | Ric ..................... | B64D 11/0015 370/254 |
| 2009/0318137 A1* | 12/2009 | Kauffman ............... | H04L 45/42 455/428 |

(Continued)

FOREIGN PATENT DOCUMENTS

| | | |
|---|---|---|
| CA | 2786159 A1 | 7/2011 |
| EP | 2315367 A1 | 4/2011 |

(Continued)

OTHER PUBLICATIONS

Office Action issued in connection with corresponding CA Application No. 2913929 dated Aug. 3, 2016.

(Continued)

Primary Examiner — Yonas Bayou
(74) Attorney, Agent, or Firm — General Electric Company; William Scott Andes

(57) ABSTRACT

A method and apparatus for managing security in a wireless network for fixed aircraft components, having a wireless access point located in the aircraft and defining the boundaries of the wireless network, a wireless remote node fixedly located within the aircraft and communicating with the wireless network, and a fixed security node.

16 Claims, 2 Drawing Sheets

(56) References Cited

U.S. PATENT DOCUMENTS

| | | | |
|---|---|---|---|
| 2011/0099371 A1* | 4/2011 | Roy | H04L 63/0823 |
| | | | 713/168 |
| 2012/0242454 A1* | 9/2012 | Wyler | H04Q 9/00 |
| | | | 340/10.1 |
| 2013/0116884 A1* | 5/2013 | Thomson | G07C 5/0825 |
| | | | 701/32.8 |
| 2013/0132548 A1* | 5/2013 | Cabos | H04L 67/16 |
| | | | 709/223 |
| 2013/0253887 A1* | 9/2013 | Bommer | H04W 16/20 |
| | | | 703/1 |
| 2014/0065954 A1* | 3/2014 | Ovens | H04L 67/12 |
| | | | 455/41.1 |
| 2014/0150049 A1* | 5/2014 | Kwon | H04L 63/1416 |
| | | | 726/1 |
| 2014/0259111 A1* | 9/2014 | Sampigethaya | H04L 63/1441 |
| | | | 726/3 |

FOREIGN PATENT DOCUMENTS

| | | | |
|---|---|---|---|
| EP | 2528408 A1 | 11/2012 | |
| EP | 2703782 A1 | 3/2014 | |
| WO | 2006119323 A2 | 11/2006 | |
| WO | 2013028198 A1 | 2/2013 | |

OTHER PUBLICATIONS

Great Britain Search Report dated Jun. 3, 2015 which was issued in connection with Great Britain Patent Application No. 1422300.2 which was filed on Dec. 15, 2014.

* cited by examiner

AIRCRAFT WIRELESS NETWORK FOR FIXED AIRCRAFT COMPONENTS

BACKGROUND OF THE INVENTION

An aircraft may include a plurality of fixed aircraft components that generate data and are in communication with one or more aircraft systems, wherein the aircraft systems receive and/or process the generated data to perform aircraft functions. In some instances, the data generated by the components is communicated to the aircraft systems by wired interconnected networks. Wireless networks may replace the wired networks of an aircraft in communicating the data generated by the fixed aircraft components to the aircraft systems.

BRIEF DESCRIPTION OF THE INVENTION

In one embodiment, the invention relates to an aircraft wireless network for fixed aircraft components, including a wireless access point located in the aircraft and defining the boundaries of the wireless network, a wireless remote node fixedly located within the aircraft and configured to communicate with the wireless network, located within the boundaries of the wireless network, and whose communication defines a radio frequency (RF) fingerprint, and a fixed security node located within the boundaries of the wireless network, having a database of authorized RF fingerprints, and configured to receive communications of the wireless network. The security node compares the RF fingerprint of the received remote node communication with the database.

In another embodiment, the invention relates to a method for managing security in a wireless network for fixed aircraft components, having a wireless access point located in the aircraft and defining the boundaries of the wireless network, a wireless remote node fixedly located within the aircraft and communicating with the wireless network, and a fixed security node. The method includes receiving, in the security node, a communication from the remote node, creating an RF fingerprint of the remote node based on the received communication, comparing the RF fingerprint with a database of authorized remote node RF fingerprints, and determining if the remote node is an authorized remote node based on the comparison.

DETAILED DESCRIPTION

The described embodiments of the present invention are directed to a wireless network for fixed components and a method for managing security in the wireless network, which may be used, for example, in an aircraft. While this description is primarily directed toward an aircraft wireless network for fixed components, it is also applicable to any environment using a wireless network for wireless radio frequency (RF) communications between fixed components. As described herein, the term "fixed" may refer to components that may be statically positioned and/or fixedly mounted to, within, and/or relative to the aircraft, itself, during aircraft operations such as taxiing and/or flight. Such fixed components may be removed, for example, for maintenance and replacement, but such removal does not mean the component is not "fixed" for purposes of this description.

Figure 1:
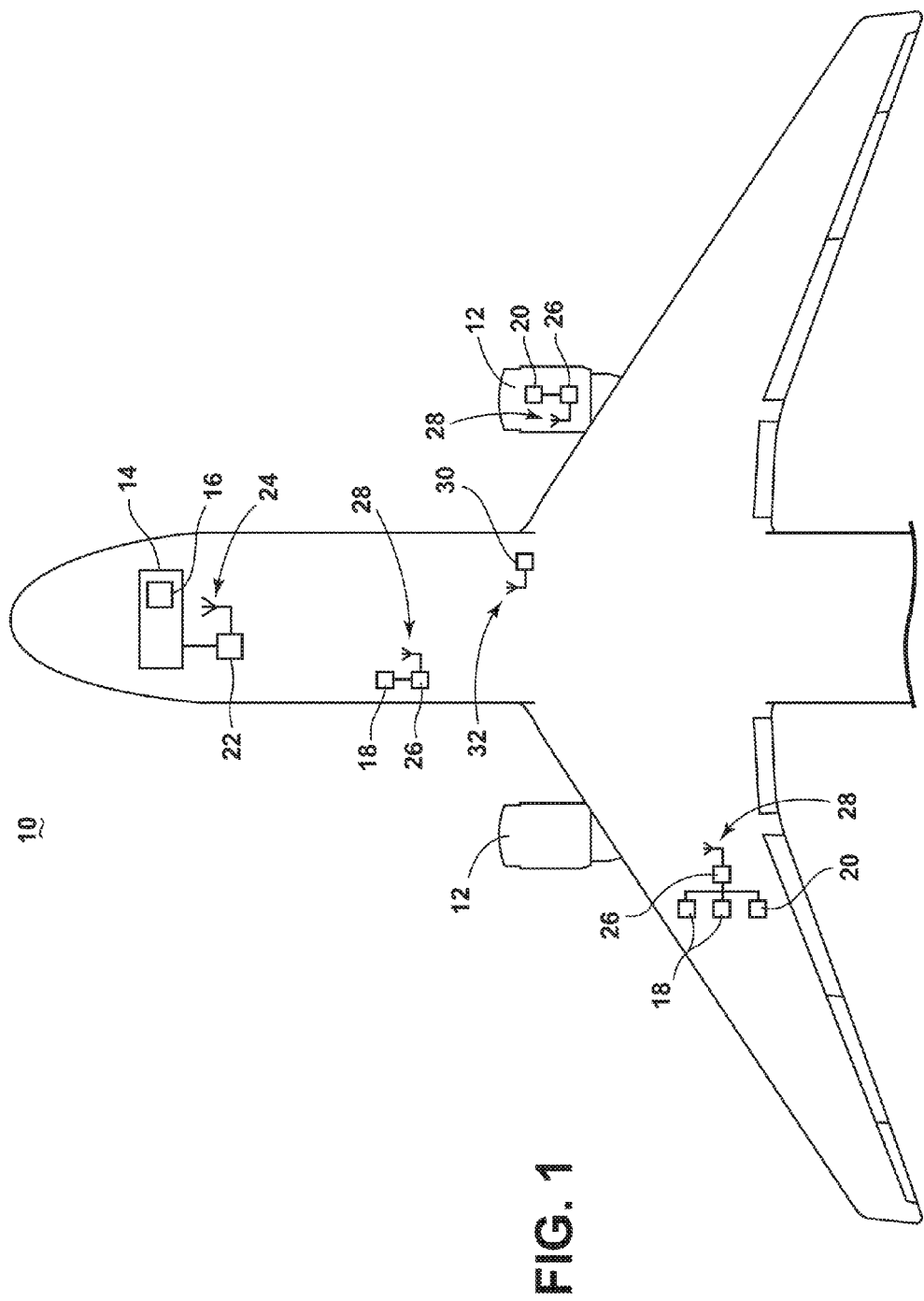
FIG. 1 is a top down schematic view of the aircraft and wireless network in accordance with one embodiment of the invention.

As illustrated in FIG. 1, an aircraft 10 may include at least one propulsion engine, shown as a left and right engine system 12. The aircraft 10 may further include at least one computer 14 or processing element having at least one data storage unit or memory 16, wherein the computer 14 is utilized to provide for aircraft operations. Non-limiting examples of the computer 14 or processing element may include a flight management system, primary flight display system, or an autopilot or autoland system. The memory 16 may include random access memory (RAM), flash memory, or one or more different types of portable electronic memory, etc., or any suitable combination of these types of memory.

The aircraft 10 may further include a plurality of fixed aircraft components, such as line-replaceable units (LRU) 18, or modular components of a vehicle or aircraft, and one or more fixed actuators 20. In the aircraft environment, LRUs 18 may be designed to operate according to a particular operation, interoperability, and/or form factor standards, such as those defined by ARINC series standards. The one or more fixed actuators 20 or actuating units may be utilized, for example, for controlling the roll, pitch, yaw, and airspeed of the aircraft, by a pilot or another avionics system by actuating the control surfaces of the aircraft 10 or thrust generation of the engine systems 12. In one example, the actuators 20 may be in communication with one or more flight control systems, such as the flight management system or pilot input devices, such as a stick or yoke, and may control the surfaces and engine by electronic transmission signals and control computers in a "fly-by-wire" system.

The illustrated aircraft 10 embodiment is merely one non-limiting example of an aircraft 10 that may be used in embodiments of the invention described herein. Particularities of the illustrated aircraft 10 embodiment, including relative size, length, number of engines, type of engines, and location of various components are not germane to the embodiments of the invention, unless otherwise noted.

In some example components, such as the LRUs 18, the components may be removably fixed to the aircraft for maintenance, diagnostics, and/or repair purposes, but statically fixed during, for example, flight. Additionally, while LRUs 18, and actuators 20 may be described, any data generating and/or data receiving components fixed relative to an aircraft may be included as embodiments of the invention as fixed components. For example, systems such as a flight management system, primary flight display, cockpit display system, autopilot, and/or autoland systems may each by be considered fixed components, as used herein.

The LRUs 18 and/or actuators 20 may include, for example entirely contained systems, sensors, radios, or other auxiliary equipment to manage and/or operate aircraft functions and may generate data during operation that may be communicated to the computer 14 or processing element, for processing and/or storing in the memory 16. Further, the LRUs 18 and/or actuators 20 may receive processed data and/or control signals from the computer 14 or processing element for operating the LRU 18 and/or actuator 20. While LRUs 18 and actuators 20 are provided as examples of fixed aircraft components, additional aircraft components may be included that provide and/or receive data from at least one computer 14 or processing element.

The aircraft 10 may further include additional fixed components configured to provide for wireless communication between the computer 14 and/or aircraft components 18, 20. For example, as shown, the aircraft 10 may comprise at least one fixed wireless access point 22 located in the aircraft, having at least one antenna 24, and defining the boundaries of a wireless network, and at least one wireless remote node 26 fixedly located within the aircraft 10, also having at least one antenna 28, and configured to communicate with the wireless access point 22 and/or the wireless network defined by the wireless access point 22. Each of the respective antennas 24, 28 may be configured and/or tailored to interact with the defined wireless network RF signal. Non-limiting examples of, the RF signal of the wireless network may include wireless standards defined by organizations or groups, such as IEEE 802.11 wireless signals, IEEE 802.15.4 signals, ultra wideband RF signals, SAE/ARINC requirements, particular RF bands such as 2.4 GHz or 5 GHz, or band ranges specifically assigned for aircraft use.

The aircraft may further include at least one security node 30, fixed relative to the aircraft 10, having at least one antenna 32, and configured to interact with the communications of the wireless network defined by the wireless access point 22. In this sense, the security node 30 may receive, or "listen" to communications of at least one access point 22 and/or remote node 26, but may not send or "broadcast" communications on the wireless network in response to the received communication. The security node 30 may be configured such that it may generate, process, read, and/or create a representation indicative of the RF signal waveform for the source of the communications, such as a remote node 26 or access point 22. In this example, the representation indicative of the RF signal waveform may be unique and/or representative of a particular remote node 26 and/or access point 22, and may be described as an "RF fingerprint." As used herein, the RF fingerprint may include characteristics of the signal and/or waveform for each respective component 22, 26, not characteristics of the data carried by the communication. The RF fingerprint may include at least one of signal strength, signal direction of arrival, signal rise time, signal fall time, and/or frequency. Additional RF fingerprint characteristics of the RF signal or waveform may be included, such as a signal radio frequency, a power level, a repeat period, and/or the duration of the signal. In one example, the RF fingerprint created may optionally include information created, processed, or extrapolated from data received in the communication, such as a sending network address. Additional information from data received in the communication may be included in the RF fingerprint to identify a node 26.

In one example embodiment of the invention, the security node 30 may be configured to distinguish between and/or identify "authorized" or "trusted" remote nodes 26 of the wireless network and "unauthorized" or "untrusted" remote nodes 26. As used in this sense, an "authorized" node is a node that has been identified as an expected participant in the wireless network of the aircraft 10, either prior to operation or during operation. The security node 30 may provide functionality of determining if a particular remote node 26 is trusted or untrusted, as described below. While terms such as "authorized" and "untrusted" are used as described, alternative language may be included to describe the authority of access by a remote node 26. Additional non-limiting examples of authority of access language may include approved/unapproved/disapproved, granted/denied, permitted/unpermitted, etc.

As shown, the one or more aircraft components 18, 20 may be communicatively coupled with a respective wireless remote node 26, such that data may be uni-directionally and/or bi-directionally communicated between each respective component 18, 20, via the wireless network communication of the remote node 26 and the access point 22, to and/or from the computer 14 for processing and/or the memory 16 for storing. In embodiments wherein one remote node 26 is communicatively coupled with multiple components 18, 20, the remote node 26 may, for example, include a data concentrator combining the communications for each respective component 18, 20 into a single wireless communication. In another embodiment, one or more remote nodes 26 may operate as a wireless relay point, relay node, or data repeater, wherein the remote node 26 may operate to extend communication from another component 18, 20 or remote node 26 to the wireless network of the aircraft 10. Each of the wireless access point 22, wireless remote nodes 26, and/or communications of the respective access point 22 or node 26 may further define an RF fingerprint that may be unique to each respective access point 22, node 26, communications of the access point 22, and/or communications of the node 26. While FIG. 1 illustrates one non-limiting example of a configuration of the access point 22, components 18, 20, remote nodes 26, and security node 30, many possible alternative configurations may be included. Any of the aforementioned components 18, 20, 22, 26, 30 may be alternatively located and/or fixed within the aircraft 10, and additional or fewer components 18, 20, 22, 26, 30 may be included. For example, each remote node 26 may have one or more components 18, 20 communicatively coupled, more than one interconnected wireless access points 22 may define the wireless network to provide broad network coverage over the entire aircraft 10, and one or more security nodes 30 may be located through the aircraft 10 to receive network communications.

Figure 2:
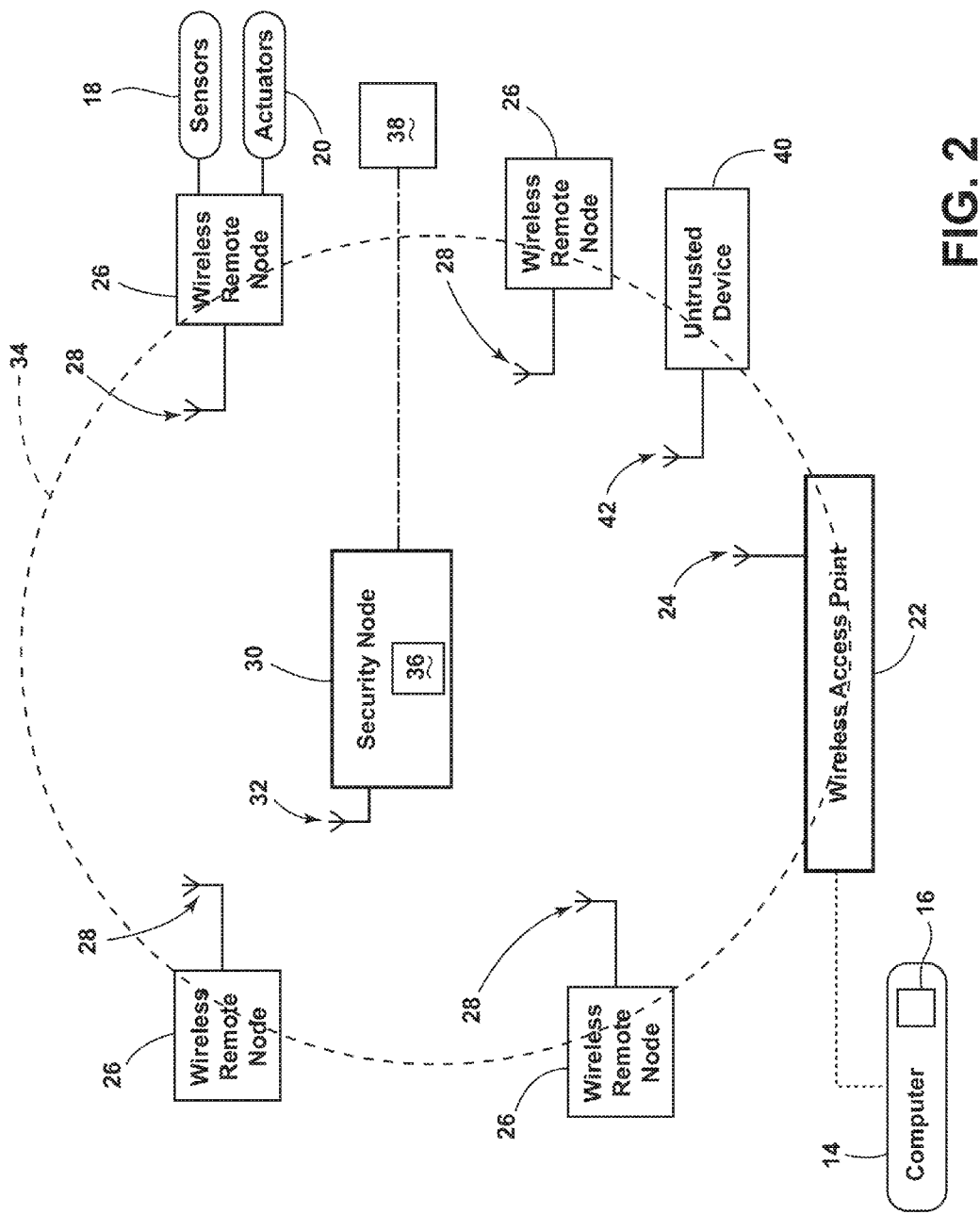
FIG. 2 is a schematic view of the wireless network and communicating devices in accordance with one embodiment of the invention.

FIG. 2 illustrates a schematic view of a wireless network 34 (whose boundaries are shown in dotted line) defined by at least one access point 22 and a plurality of "authorized" or "trusted" remote nodes 26 in accordance with one embodiment of the invention. As shown, at least a portion of each of the remote nodes 26, for example, a portion having the antenna 28, is located within the boundaries of the wireless network 34 range. Also shown is at least one security node 30 having at least a portion, for example, a portion having the antenna 32, is located within the boundaries of the wireless network 34 range, and including memory 36. The example configuration shown further includes at least one "unauthorized" node, illustrated as an untrusted device 40, and having at least one antenna 42.

As shown, the security node 30 may further include memory 36 configured to store data related to or indicative of RF fingerprints of the wireless network 34, for example, the signal radio frequency, the power level, the repeat period of the signal, the duration of the signal, and/or the direction of the signal. For example, the memory 36 may include a database of authorized and/or unauthorized RF fingerprints for the wireless network. The database may be predefined prior to aircraft service, and may be further updatable during operation and/or maintenance service. While the database is described as including authorized and/or unauthorized RF fingerprints for the wireless network, embodiments of the database may include authorized and/or unauthorized RF fingerprint ranges for the wireless network. In this sense, an RF fingerprint "range" may be predefined to include a known or unknown variance in the RF fingerprint, for example, that may occur when the RF fingerprint traverses through or experiences different interference and/or mediums, such as passengers of the aircraft 10, cargo of the aircraft 10, varying fuel levels, environmental conditions, altitude, and/or humidity. In this example, slight variances of the RF fingerprint due to interference and/or medium may still fall within, for example, an authorized RF fingerprint range. Additional differences in interference and/or mediums may be included.

The security node 30 is further shown communicatively coupled with the human interface device 38, which may be configured to provide indicia to a user, such as an alert, sound, or light, based on the communication. The human interface device 38 may be removably positioned within the aircraft 10 such that a user, such as a pilot or other airline employee may interact with, or view the indicia, as needed. While the human interface device 38 is illustrated outside of the wireless network 34, embodiments of the invention may include a human interface device 38 that includes an antenna, and is communicatively coupled with the security node 30 by way of the wireless network 34. Additionally, if multiple security nodes 30 are included as part of the wireless network 34, each may be communicatively coupled with the human interface device 38, or may be coupled with multiple human interface devices 38.

The embodiments of the invention described herein describe a method and apparatus configured to manage the security of a wireless network 34 for fixed components 18, 20, 26, 24 of an aircraft 10. During operation of the aircraft 10, which may include non-flight operations such as taxiing, maintenance, etc., the security node 30 may receive communications from one or more remote nodes 26, 40 of the wireless network 34. The security node 30 creates an RF fingerprint of each remote node 26, 40 based on the received communication, as described above, and may compare the RF fingerprint with the memory 36 and/or database of authorized remote node RF fingerprints, or range of RF fingerprints, as explained above, of the security node 30. The security node 30 may then determine if the remote node 26, 40 is an authorized remote node 26 that is expected to be communicating with, or as part of, the wireless network 34, based on the comparison.

In the example shown, communication from each of the "authorized" remote nodes 26 will be received by the security node 30, which will in turn create an RF fingerprint for each respective "authorized" remote node 26. Each RF fingerprint will be compared against the authorized RF fingerprint database of the security node 30, wherein a comparison of each RF fingerprint against the database will indicate each of the "authorized" remote nodes 26 are, indeed, authorized to be part of the wireless network 34. Conversely, when the security node 30 receives communication from the untrusted device 40 on the wireless network 34 and creates an RF fingerprint for the device 40, a comparison of the RF fingerprint with the database of authorized devices will indicate the untrusted device 40 is not authorized to be part of the wireless network 34. The sequence described is for exemplary purposes only and is not meant to limit the method or functionality of the wireless network 34 or security node 30 in any way as it is understood that the portions of the method may proceed in a different logical order, additional or intervening portions may be included, or described portions of the method may be divided into multiple portions, or described portions of the method may be omitted without detracting from the described method.

Based on the determination that an untrusted device 40 is attempting to communicate on the wireless network 34 of the aircraft 10, the security node 30 may take further steps to mitigate risks of unauthorized access. For example, the security node 30 may communicate with the human interface device 38 to provide indication to a pilot or employee that an untrusted device 40 is attempting to communicate with the wireless network 34. Embodiments of the invention may allow the human interface device 38 to provide feedback from the pilot of employee to either "authorize" the untrusted device 40. Alternatively, the security node 30 may log the attempted access of the untrusted device 40 to memory 36. Embodiments of the invention may further include logging any authorized or unauthorized access of the wireless network 34 to memory 36, or communicating with the human interface device 38 to provide indication of any and/or all of the authorized or unauthorized access of the wireless network 34.

In yet another example of embodiments of the invention, if a comparison of an RF fingerprint created from communication of an remote node 26 determines that the RF fingerprint is substantially similar to an authorized remote node 26 RF fingerprint, yet not within a tolerance of the comparison or RF fingerprint range defined, the security node 30 may be capable of communicating with the human interface device 38 to provide indication of a possible authorized remote node 26 communication to a pilot or employee. In this example, the human interface device 38 may receive an input from the pilot or employee to authorize or grant for example, full access, limited access, and/or temporary access to the remote node 26, which in turn will update the memory 36 of the security node 30 to identify the RF fingerprint of the remote node 26 as an authorized device. For example, the database entry for that remote node 26 may be overwritten with the current RF fingerprint created by the security node 30, or the database entry for that remote node 26 may be updated with a new or different predetermined variance range for the stored RF fingerprint that includes the current RF fingerprint. Alternatively, the security node 30 may include the overwriting or updating functionality described without user input, such that the security node 30 may "learn" new or changing RF fingerprints during repeated received communication with the wireless network 34. For example, any overwriting and/or updating of the database in the memory 36 of the security node 30 may be logged in the memory 36.

Many other possible embodiments and configurations in addition to that shown in the above figures are contemplated by the present disclosure. For example, one embodiment of the invention contemplates including a plurality of interconnected communicating security nodes 30 distributed about the aircraft 10 such that the security node 30 network may be able to physically locate or physically estimate, for example by RF signal analysis and/or RF signal triangulation, the source of an authorized or unauthorized communication on the wireless network 34. In this example, the plurality of security nodes 30 may all be located within the boundaries of the wireless network 34.

In another example embodiment of the invention, each access point 22 and node 26, 30 may be configured with a plurality of antennas that are configured to communicate over a plurality of wireless networks 34 having distinguishable band ranges, dissimilar operating radio frequencies, and/or predefined communicating means, individually or simultaneously. For example, the plurality of wireless networks 34 may be provided for data redundancy in the aircraft. In this example, the security node 30 may be configured to create individual RF fingerprints for each remote node 26 communication on the dissimilar wireless networks 34, which may then be compared against the database for improved and/or redundant security of the wireless networks 34. Additionally, the method and apparatus may include enabling or disabling a portion of the wireless networks that are being accessed by unauthorized devices, based on the comparison of the security node 30.

The embodiments disclosed herein provide a method and apparatus for managing security in a wireless network for fixed aircraft components. The technical effect is that the above described embodiments enable the determination and/or identification of unauthorized nodes attempting to access the wireless network of the aircraft. One advantage that may be realized in the above embodiments is that the above described embodiments ensure that communications for a given network node are originating from an authorized network node, and possible from an expected physical location. Another advantage may include suitable alerts and/or logging of authorized and/or unauthorized access in order to protect the security of the wireless network. Furthermore, due to the creation of the RF fingerprint, and not relying solely on a data analysis of the communications, the security node may be capable of identifying untrusted or unauthorized devices that may be attempting to mask their identities, or "spoof" their identities as a trusted node. In this example, "spoofing" may be limited to masking the identity of the unauthorized device through data transmission characteristics, such as media access control (MAC) addressing, and/or internet protocol (IP) addressing, as opposed to signal waveform (i.e. RF fingerprint characteristics).

Yet another advantage of the above-described system allows for the continual learning of the RF fingerprints over a period of time such that variance from RF signal, for example, due to aircraft load, may be updated as needed, to ensure proper security node operations despite varying RF signal conditions. Furthermore, by utilizing wireless networks, aircrafts may be able to shed the previous wired network communication lines that had interconnected the components with the aircraft systems. The result of eliminating the need for miles of metal wiring may be significant, and may result in improved efficiency of aircraft operations and/or fuel savings. The above-described embodiments provide for an improved detection system for identifying authorized and unauthorized wireless access in an aircraft. Improved detection improves the overall security and integrity of the wireless network.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft wireless network for fixed aircraft components, comprising:
    a wireless access point located in the aircraft and defining the boundaries of the wireless network;
    a wireless remote node fixedly located within the aircraft and communicating with the wireless network, located within the boundaries of the wireless network, and whose communication defines a radio frequency (RF) fingerprint; and
    more than one fixed security nodes located within the boundaries of the wireless network, having a database of authorized RF fingerprints, and receiving communications of the wireless network;
    wherein the more than one fixed security nodes compare the RF fingerprint of the received remote node communication with the database,
    wherein the more than one fixed security nodes a level of access of the wireless remote node to the wireless network based at least partially on the comparison of the RF fingerprint with the database based on repeated received communication, and
    wherein the more than one fixed security nodes triangulate the received communications to determine the location of the wireless remote node within the boundaries of the wireless network.

2. The wireless network of claim 1, wherein each of the wireless access point and wireless remote node comprise multiple antennas, and
    wherein the RF fingerprint comprises a signal sending network address.

3. The wireless network of claim 2, wherein each antenna of the multiple antennas communicates over a plurality of wireless networks having dissimilar operating radio frequencies, and each communication defines an RF fingerprint.

4. The wireless network of claim 2, further comprising a human interaction device communicatively coupled with the at least one of the more than one fixed security nodes and providing indicia of the communication based on the comparison, to a user,
    the indicia of the communication further comprising sending an alert to at least an aircraft pilot.

5. The wireless network of claim 2, further comprising a second security node located within the boundaries of the wireless network away from the more than one fixed security nodes, communicatively coupled with the at least one of the more than one fixed security nodes, and receiving communications of the wireless network, wherein the at least one of the more than one fixed security nodes and the second security node collectively compare each respectively received RF fingerprint with the database.

6. The wireless network of claim 3, wherein the more than one fixed security nodes receive communications from each wireless network of the plurality of wireless networks, and wherein the more than one fixed security nodes further compare the RF fingerprint of at least one wireless remote node communication on each wireless network of the plurality of wireless networks with the database.

7. The wireless network of claim 3, further comprising a human interaction device communicatively coupled with the at least one of the more than one fixed security nodes and providing indicia of the communication based on the comparison, to a user,
    the indicia of the communication further comprising at least one of a sound or a light.

8. The wireless network of claim 6, wherein the RF fingerprint comprises at least one of signal direction of arrival, signal rise time, or signal fall time.

9. The wireless network of claim 8 further comprising:
at least one of a computer or a processing element; and
at least one of a data storage unit or memory,
wherein the database of authorized RF fingerprints further comprises a predetermined database of authorized RF fingerprints, and
wherein the at least one of a computer or a processing element further comprises at least one of a flight management system, a primary flight display system, an autopilot system or an autoland system.

10. The wireless network of claim 9, further comprising a human interaction device communicatively coupled with at least one of the more than one fixed security nodes and is configured to provide indicia of the communication based on the comparison, to a user,
wherein the RF fingerprint comprises a signal wave form.

11. The wireless network of claim 1, wherein the database of authorized RF fingerprints further comprises a range of authorized RF fingerprints wherein the range takes into account a predefined variance of the authorized RF fingerprints due to at least one of aircraft cargo, passengers, varying fuel levels, environmental conditions, altitude, or humidity.

12. The wireless network of claim 1, wherein the wireless remote node further comprises a data concentrator communicatively coupled with at least one of a sensor, actuator, or line replaceable unit, such that the data provided to the data concentrator is communicated to the wireless network, and
wherein the RF fingerprint comprises at least one of signal repeat period or signal power level.

13. A method for managing security in a wireless network having a wireless access point located in the aircraft and defining the boundaries of the wireless network, a wireless remote node fixedly located within the aircraft and communicating with the wireless network, and a fixed security node, the method comprising:
receiving, in the fixed security node, a communication from the wireless remote node;
creating an RF fingerprint of the wireless remote node based on the received communication;
comparing the RF fingerprint with a database of authorized remote node RF fingerprints;
determining if the wireless remote node is an authorized wireless remote node based on the comparison,
authorizing, in the fixed security node, a level of access of the wireless remote node to the wireless network, the authorizing based at least partially on the comparison of the RF fingerprint with the database;
providing indicia to a user based upon a determination that a remote node is unauthorized;
receiving, in the fixed security node, a user input to update the database to include the unauthorized wireless remote node RF fingerprint; and
learning an RF fingerprint variance of an authorized wireless remote node based on repeated received communication,
wherein authorizing a level of access comprises at least one of granting full access, granting limited access, granting temporary access and denying access,
wherein the database comprises a computer-searchable database of information, the computer-searchable database of information including memory and one or more processors, and
wherein receiving, in the fixed security node, comprises receiving at least one communication in multiple fixed security nodes from the wireless remote node, and triangulating the at least one communication in the multiple fixed security nodes the location of the wireless remote node within the boundaries of the wireless network.

14. The method of claim 13, further comprising learning an RF fingerprint variance of an authorized wireless remote node based on repeated received communications,
the wireless network having a wireless access point located in the aircraft and defining the boundaries of the wireless network,
wherein authorizing a level of access comprises granting temporary access to the wireless network.

15. The method of claim 14, further comprising updating the database of authorized remote node RF fingerprints to include the RF fingerprint variance based on the learning,
the wireless remote node fixedly located within the aircraft and communicating with the wireless network.

16. The method of claim 13, further comprising:
learning an RF fingerprint variance of an authorized remote node based on repeated received communications,
determining that the wireless remote node is an unauthorized wireless remote node based on the comparison, and
disabling one or more portions of the network being accessed by the wireless unauthorized remote node.

* * * * *